(12) United States Patent
Schnaibel et al.

(10) Patent No.: US 6,761,023 B1
(45) Date of Patent: Jul. 13, 2004

(54) METHOD FOR OPERATING AN INTERNAL COMBUSTION ENGINE, IN PARTICULAR, OF A MOTOR VEHICLE

(75) Inventors: Eberhard Schnaibel, Hemmingen (DE); Andreas Koring, Ludwigsburg (DE); Holger Bellmann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/169,205

(22) PCT Filed: Nov. 17, 2000

(86) PCT No.: PCT/DE00/04042

§ 371 (c)(1),
(2), (4) Date: Oct. 8, 2002

(87) PCT Pub. No.: WO01/49987

PCT Pub. Date: Jul. 12, 2001

(30) Foreign Application Priority Data

Dec. 31, 1999 (DE) .......................................... 199 63 932

(51) Int. Cl.[7] ................................................. F01N 3/00
(52) U.S. Cl. ............................. 60/277; 60/274; 60/285; 123/295
(58) Field of Search .......................... 60/274, 276, 277, 60/285, 286, 295, 284; 123/295, 299, 300

(56) References Cited

U.S. PATENT DOCUMENTS

| | | | | |
|---|---|---|---|---|
| 5,526,643 A | * | 6/1996 | Mukaihira et al. .............. 60/277 |
| 5,630,315 A | * | 5/1997 | Theis ............................. 60/277 |
| 5,706,652 A | * | 1/1998 | Sultan ............................ 60/277 |
| 5,860,277 A | * | 1/1999 | Schnaibel et al. ............... 60/277 |
| 5,960,627 A | * | 10/1999 | Krampe et al. ................. 60/286 |
| 5,967,113 A | | 10/1999 | Kuwabara et al. |
| 5,983,630 A | * | 11/1999 | Kibe et al. ...................... 60/285 |
| 6,141,960 A | * | 11/2000 | Takami et al. .................. 60/286 |
| 6,145,302 A | * | 11/2000 | Zhang et al. ................... 60/277 |
| 6,240,721 B1 | * | 6/2001 | Ito et al. ......................... 60/274 |
| 6,378,297 B1 | * | 4/2002 | Ito et al. ......................... 60/285 |
| 6,408,616 B1 | * | 6/2002 | Mazur et al. ................... 60/274 |
| 6,438,943 B1 | * | 8/2002 | Yamamoto et al. ........... 123/295 |

FOREIGN PATENT DOCUMENTS

| | | |
|---|---|---|
| DE | 43 30 997 | 3/1995 |
| DE | 198 11 574 | 9/1999 |

* cited by examiner

*Primary Examiner*—Thomas Denion
*Assistant Examiner*—Tu M. Nguyen
(74) *Attorney, Agent, or Firm*—Kenyon & Kenyon

(57) ABSTRACT

An internal combustion engine for a motor vehicle. In the internal combustion engine, fuel is injected directly into a combustion chamber and is burned during an intake phase in a first mode of operation and during a compression phase in a second mode of operation. Exhaust gas formed by combustion may be sent to a catalytic converter. A controller may cause additional fuel to be injected following combustion in the second mode of operation. The controller may also cause the temperature of the exhaust gas to be measured in or downstream from the catalytic converter and compared with a threshold value.

9 Claims, 2 Drawing Sheets

METHOD FOR OPERATING AN INTERNAL COMBUSTION ENGINE, IN PARTICULAR, OF A MOTOR VEHICLE

FIELD OF THE INVENTION

The present invention relates to a method for operating an internal combustion engine of a motor vehicle, in which fuel is injected directly into a combustion chamber and burned during an intake phase in a first mode of operation and during a compression phase in a second mode of operation, and in which exhaust gas formed by combustion is sent to a catalytic converter. The present invention also relates to a controller for an internal combustion engine of a motor vehicle and to an internal combustion engine for a motor vehicle.

BACKGROUND INFORMATION

Such a method, such a controller and such an internal combustion engine are conventional in direct gasoline injection, for example, where fuel is injected into the combustion chamber of the internal combustion engine during the intake phase in homogenous operation or during the compression phase in stratified charge operation. Homogeneous operation is provided for full-load operation of the internal combustion engine, while stratified charge operation is suitable for idling and partial load operation. Such a direct injection internal combustion engine is switched between these modes of operation as a function of the required torque, for example. For implementation of stratified charge operation it is necessary to have a catalytic converter with which the nitrogen oxides formed may be stored temporarily in a storage catalytic converter so that they may be reduced during a subsequent homogeneous operation. The storage catalytic converter is loaded with nitrogen oxides in stratified charge operation and is unloaded again in homogeneous operation. This loading and unloading as well as the associated conversion of nitrogen oxides to nitrogen and oxygen result in aging of the catalytic converter.

SUMMARY OF THE INVENTION

It is an object of the present invention to create a method of operating a storage catalytic converter of an internal combustion engine with which the aging of the storage catalytic converter is detectable.

The exhaust gas generated in the internal combustion engine contains pollutants which are converted in the catalytic converter. These include unburned hydrocarbons and carbon monoxide. Conversion of these pollutants results in an increase in temperature of the resulting exhaust gases. However, this increase in temperature is less in the case of an aged catalytic converter due to its reduced conversion capacity. It is thus fundamentally possible to use the resulting increase in temperature as a measure of the aging of the catalytic converter.

This temperature increase occurs even without the additionally injected fuel. In this case, however, the temperature increase is so slight, e.g., in the case of an aged catalytic converter, that it may no longer allow reliable determination of aging of the catalytic converter.

An additional conversion and thus also an additional increase in temperature of the exhaust gas is achieved by injection of additional fuel. This may allow a reliable and certain determination of the aging status of the catalytic converter. In an example embodiment of the present invention, a temperature increase is measured and compared with a temperature increase measured with a new catalytic converter, and the difference is compared with an upper limit value. It is thus readily possible to detect an aged catalytic converter.

In a similar manner, a temperature increase is measured and compared with a modeled temperature increase, and the difference is compared with an upper limit value.

In another example embodiment of the present invention, a maximum temperature is measured and compared with a lower threshold value. This is an option for implementation of the present invention that may be executed especially easily and rapidly.

It may be advantageous if the additional fuel injected is not ignited. This guarantees that the unburned fuel in the form of unburned hydrocarbons and carbon monoxide will enter the exhaust pipe and the catalytic converter and result in an elevated temperature there.

Implementation of the method according to the present invention in the form of a control element which is provided for a controller of an internal combustion engine in a motor vehicle is especially important. A program capable of running on a computer, e.g., on a microprocessor, and suitable for execution of the method according to the present invention is stored on this control element. Thus in this case, the present invention is implemented by a program stored on this control element, so that this control element equipped with the program constitutes the present invention in the same manner as the method for whose execution the program is suitable. An electric memory medium such as a read-only memory or a flash memory may be used as the control element.

Additional features, possible applications and advantages of the present invention are derived from the following description of example embodiments of the present invention which are illustrated in the figures in the drawing. All the features illustrated or described here, either alone or in any desired combination, constitute the object of the present invention, regardless of how they are combined in the patent claims or their reference back to preceding claims and independently of how they are formulated in the description or illustrated in the drawing.

DETAILED DESCRIPTION

Figure 1:
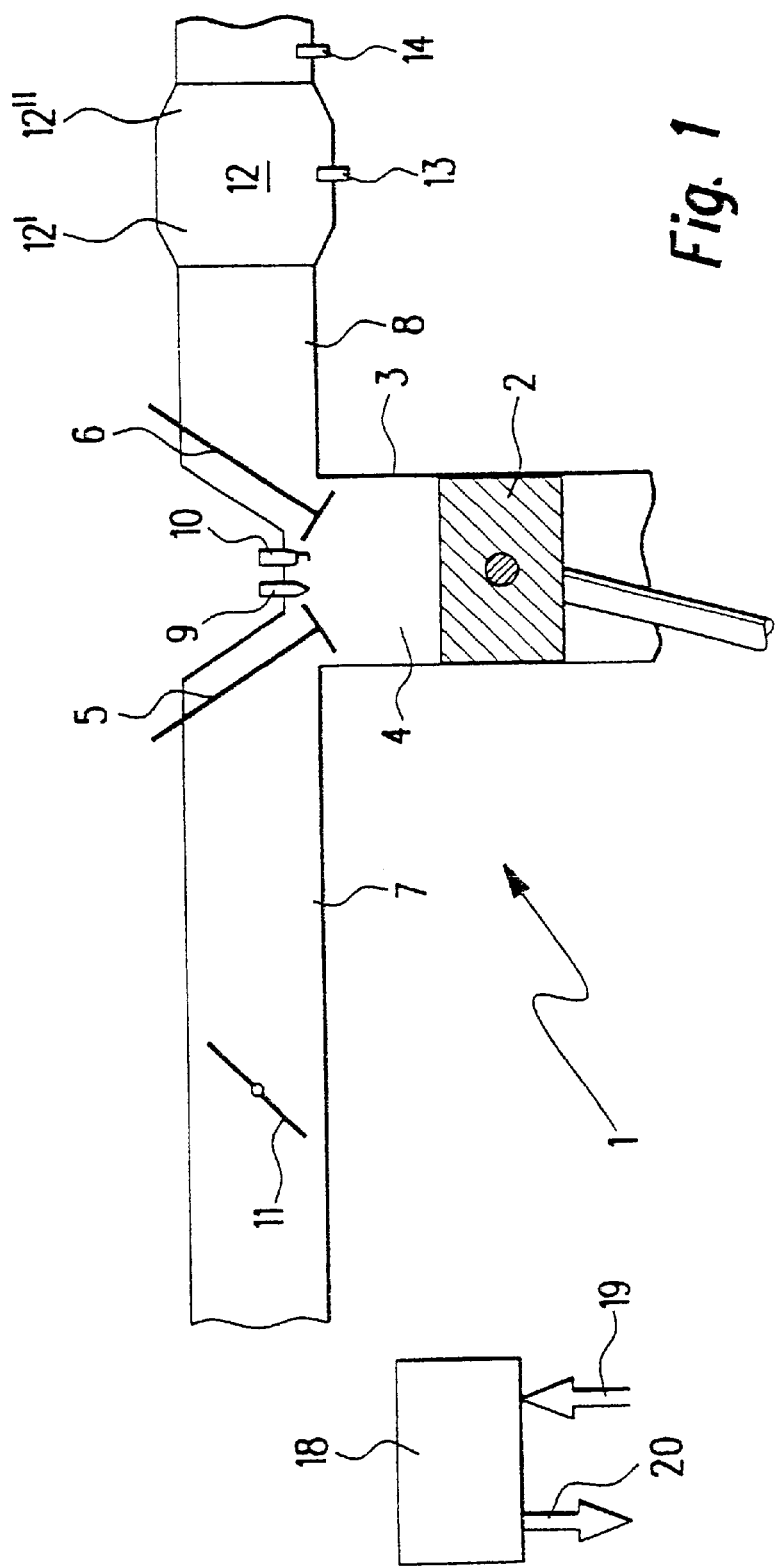
FIG. 1 shows a schematic diagram of an example embodiment of an engine according to the present invention.

FIG. 1 shows an internal combustion engine 1 of a motor vehicle in which a piston 2 is movable back and forth in a cylinder 3. Cylinder 3 is equipped with a combustion chamber 4 delimited by piston 2, an intake valve 5 and an exhaust valve 6. An intake manifold 7 is connected to intake valve 5, and an exhaust pipe 8 is connected to exhaust valve 6.

A fuel injector 9 and a spark plug 10 protrude into combustion chamber 4 in the area of intake valve 5 and exhaust valve 6. Fuel may be injected into combustion chamber 4 through intake valve 9. Fuel in combustion chamber 4 may be ignited with spark plug 10.

A rotatable throttle valve 11 through which air may be supplied to intake manifold 7 is accommodated in intake manifold 7. The amount of air supplied depends on the angular setting of throttle valve 11. A catalytic converter 12 is accommodated in exhaust pipe 8 to purify the exhaust gas formed by combustion of fuel.

Catalytic converter 12 in the present example embodiment is a three-way catalytic converter 12' which is combined with a storage catalytic converter 12". It is self-evident that other types and/or combinations of catalytic converters are also conceivable. For example, preliminary catalytic converters and main catalytic converters and the like may also be provided. The catalytic converter 12 is suitable for treatment and for conversion of the pollutants of the exhaust gas generated by internal combustion engine 1.

A temperature sensor 13 is included in catalytic converter 12. Alternatively or additionally, a temperature sensor 14 is included in the exhaust pipe directly downstream from catalytic converter 12.

A controller 18 receives input signals 19 representing operating variables of internal combustion engine 1 measured by sensors. Controller 18 generates output signals 20 with which the performance of internal combustion engine 1 may be influenced via actuators. Among other things, controller 18 is provided for controlling and/or regulating the operating variables of internal combustion engine 1. To this end, controller 18 is equipped with a microprocessor which includes a program suitable for execution of this control and/or regulation stored in a memory medium, e.g., in a flash memory.

In a first mode of operation, referred to as homogeneous operation of internal combustion engine 1, throttle valve 11 is partially opened or closed as a function of the desired torque. Fuel is injected by injector 9 into combustion chamber 4 during an intake phase produced by piston 2. Turbulence is created in the injected fuel due to the simultaneous air intake through throttle valve 11, and thus fuel is distributed uniformly in combustion chamber 4. Then the fuel/air mixture is compressed during the compression phase and ignited by spark plug 10. Expansion of ignited fuel drives piston 2. The resulting torque in homogeneous operation depends on the setting of throttle valve 11, among other things. From the standpoint of low emissions, the fuel/air mixture is set as closely as possible to a lambda value of one.

In a second mode of operation, referred to as stratified charge operation of internal combustion engine 1, throttle valve 11 is wide open. Fuel is injected into combustion chamber 4 by injector 9 during a compression phase produced by piston 2, namely locally in the immediate vicinity of spark plug 10 and chronologically at a suitable interval before the ignition time. Then the fuel is ignited with the help of spark plug 10, so that piston 2 is driven by the expansion of the ignited fuel in the following working phase. The resulting torque in stratified charge operation depends largely on the fuel mass injected. Stratified charge operation is provided for idling operation and partial load operation of internal combustion engine 1.

Storage catalytic converter 12" of catalytic converter 12 is loaded with nitrogen oxides during stratified charge operation. In a subsequent homogeneous operation, storage catalytic converter 12" is unloaded again, and the nitrogen oxides are reduced by three-way catalytic converter 12'.

Storage catalytic converter 12" takes up sulfur over a period of time during its continuous loading and unloading of nitrogen oxides. This results in a diminished storage capacity of storage catalytic converter 12", which is referred to below as aging. The continuous conversion of exhaust gases to nitrogen and oxygen, among other things, in three-way catalytic converter 12' results in a diminished conversion capacity and thus to aging.

The conversion of the exhaust gases in three-way catalytic converter 12' is an exothermic reaction in which heat is generated. This results in an increase in the temperature of the exhaust gases flowing through catalytic converter 12. This temperature increase is measured by temperature sensor 13 and/or by temperature sensor 14. At the same time, there is also an increase in the temperature of catalytic converter 12 itself due to the exothermic reaction and this is alternatively or additionally measured by temperature sensor 13 and optionally also by temperature sensor 14.

However, the increase in temperature produced by the exothermic reaction is not sufficient to be detected reliably.

For this reason, an additional injection of fuel into combustion chamber 4 following combustion is triggered by controller 18 in stratified charge operation of internal combustion engine 1. However, this fuel is not ignited. Therefore, unburned fuel enters exhaust pipe 8 and catalytic converter 12. Due to the oxygen present there and the high temperatures prevailing there, the fuel in exhaust pipe 8 and in catalytic converter 12 reacts with the oxygen. This results in an increase in temperature of the exhaust gas in exhaust pipe 8 and in catalytic converter 12.

The exhaust gas present in exhaust pipe 8 and having an elevated temperature goes to catalytic converter 12, where there is another increase in temperature due to the conversion of the exhaust gas resulting from the additional injection. On the whole, this results in a greater temperature increase due to the conversion of the exhaust gas by catalytic converter 12.

In addition, the higher temperature of the exhaust gas entering catalytic converter 12 also results in a greater temperature increase in the exhaust gas in catalytic converter 12 due to the conversion.

Due to the additional injection of fuel following combustion in stratified charge operation, a greater increase in temperature of the exhaust gas is thus achieved due to the conversion of same in catalytic converter 12.

Due to the aging of three-way catalytic converter 12', the ability to convert exhaust gases in three-way catalytic converter 12' declines. This results in a diminished reaction of fuel and oxygen in catalytic converter 12 and thus to a reduction in the resulting rise in temperature. The lower ability to convert results in a reduction in the exothermic reaction produced by the conversion and thus to a reduction in the resulting temperature increase.

Controller 18 monitors the temperature increase measured instantaneously during operation of internal combustion engine 1. This may occur by comparing the instantaneous temperature increase with a temperature increase measured with a new three-way catalytic converter 12' or a new catalytic converter 12. Alternatively or additionally, the instantaneous temperature increase may be compared with a temperature increase measured with a defective three-way catalytic converter 12' or catalytic converter 12. Alternatively or additionally, this may also occur by comparing the instantaneous temperature increase with a modeled temperature increase.

In a comparison with a new catalytic converter 12, the difference between the temperature increase measured instantaneously and the temperature increase of new catalytic converter 12 becomes progressively greater. When the difference between the instantaneous temperature increase and the temperature increase of new catalytic converter 12 exceeds an upper threshold value, controller 18 deduces that catalytic converter 12 has now reached a stage of aging which is no longer acceptable from the standpoint of adequate exhaust purification. Controller 8 then generates a signal, for example, which may be perceived by the driver or by a workshop and indicates that catalytic converter 12 should be replaced.

In a comparison with a defective catalytic converter 12, the difference between the temperature increase measured instantaneously and the temperature increase of defective catalytic converter 12 becomes progressively smaller, so that the difference is compared with a respective lower threshold value which, when reached, indicates that catalytic converter 12 should be replaced.

When using the modeled temperature increase, the difference in comparison with the instantaneous temperature increase becomes progressively greater, so that the difference is compared with a respective upper threshold value which, when exceeded, indicates that catalytic converter 12 should be replaced.

Alternatively or additionally, the comparison may be based on the absolute temperatures. This is illustrated in FIG. 2.

Figure 2:
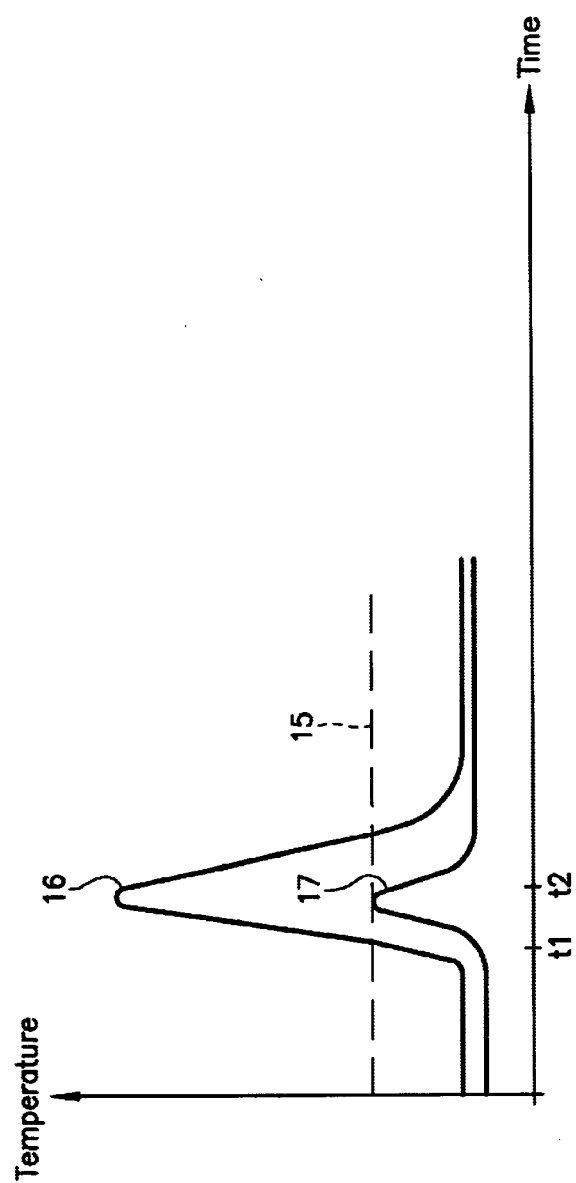
FIG. 2 shows a schematic diagram of temperature increases with the combustion engine in FIG. 1.

FIG. 2 shows the temperature of the exhaust gas emitted from catalytic converter 12 plotted as a function of time. Up to a time t1, internal combustion engine 1 is operated in stratified charge operation. Approximately at time t1 there is an additional injection following combustion. This additional injection and the resulting additional conversion of the exhaust gases generated by catalytic converter 12 result in an additional increase in temperature of the exhaust gas.

The additional temperature increase due to the additional injection is equivalent to a maximum temperature measured by temperature sensor 13 and/or temperature sensor 14. This maximum temperature becomes smaller over time due to the aging of catalytic converter 12.

If catalytic converter 12 is not yet aged and if catalytic converter 12 thus still has an adequate conversion capacity, this results in a maximum temperature which exceeds a lower threshold value 15. This is indicated with reference number 16 in FIG. 2.

However, if catalytic converter 12 no longer has an adequate conversion capacity, then catalytic converter 12 is aged and is thus spent, so that threshold value 15 is no longer exceeded. This is labeled with reference number 17 in FIG. 2.

After time t2, internal combustion engine 1 is then again operated in stratified charge operation by controller 18.

The method described above may be used continuously during operation of internal combustion engine 1. Alternatively or additionally, it is possible to use this method specifically for diagnosing aging of catalytic converter 12.

What is claimed is:

1. A method for diagnosing a catalytic converter of an internal combustion engine of a motor vehicle, comprising the steps of:
   injecting a fuel directly into a combustion chamber;
   burning the fuel during an intake phase in a first mode of operation and during a compression phase in a second mode of operation;
   sending an exhaust gas formed by combustion to the catalytic converter;
   injecting an additional amount of the fuel following combustion in the second mode of operation;
   measuring a temperature of the exhaust gas at least one of in and downstream from the catalytic converter; and
   comparing the temperature of the exhaust gas with a threshold value;
   wherein a first temperature increase is measured and compared with a second temperature increase measured with one of a new catalytic converter and a defective catalytic converter, and a difference between the first temperature increase and the second temperature increase is compared with at least one of an upper limit value and a lower limit value.

2. The method according to claim, 1, wherein:
   the additional amount of the fuel is not ignited.

3. A storage medium that stores a computer program that when executed by a computer enables a diagnosing of a catalytic converter of an internal combustion engine of a motor vehicle to be performed in accordance with a method including:
   injecting a fuel directly into a combustion chamber;
   burning the fuel during an intake phase in a first mode of operation and during a compression phase in a second mode of operation;
   sending an exhaust gas formed by combustion to the catalytic converter;
   injecting an additional amount of the fuel following combustion in the second mode of operation;
   measuring a temperature of the exhaust gas at least one of in and downstream from the catalytic converter; and
   comparing the temperature of the exhaust gas with a threshold value;
   wherein a first temperature increase is measured and compared with a second temperature increase measured with one of a new catalytic converter and a defective catalytic converter, and a difference between the first temperature increase and the second temperature increase is compared with at least one of an upper limit value and a lower limit value.

4. The storage medium according to claim 3, wherein:
   the storage medium is a flash memory.

5. The storage medium according to claim 3, wherein:
   the computer is a microprocessor.

6. A controller for diagnosing a catalytic converter of an internal combustion engine of a motor vehicle, comprising:
   an arrangement for injecting a fuel directly into a combustion chamber;
   an arrangement for burning the fuel during an intake phase in a first mode of operation and during a compression phase in a second mode of operation;
   an arrangement for sending an exhaust gas formed by combustion to the catalytic converter;
   an arrangement for injecting an additional amount of the fuel following combustion in the second mode of operation;
   an arrangement for measuring a temperature of the exhaust gas at least one of in and downstream from the catalytic converter; and
   an arrangement for comparing the temperature of the exhaust gas with a threshold value;
   wherein a first temperature increase is measured and compared with a second temperature increase measured with one of a new catalytic converter and a defective catalytic converter, and a difference between the first temperature increase and the second temperature increase is compared with at least one of an upper limit value and a lower limit value.

7. An internal combustion engine for a motor vehicle, comprising:
   a combustion chamber into which a fuel is directly injected, the fuel being burned during an intake phase in a first mode of operation and during a compression phase in a second mode of operation;

a catalytic converter that receives an exhaust gas formed by combustion; and a controller for diagnosis of the catalytic converter;

wherein the controller causes an additional amount of the fuel to be injected following combustion in the second mode of operation, and the controller causes a temperature of the exhaust gas at least one of in and downstream from the catalytic converter to be measured and compared with a threshold value; and wherein the controller is configured so that a first temperature increase is measured and compared with a second temperature increase measured with one of a new catalytic converter and a defective catalytic converter, and a difference between the first temperature increase and the second temperature increase is compared with at least one of an upper limit value and a lower limit value.

8. A method for diagnosing a catalytic converter of an internal combustion engine of a motor vehicle, comprising the steps of:

injecting a fuel directly into a combustion chamber;

burning the fuel during an intake phase in a first mode of operation and during a compression phase in a second mode of operation;

sending an exhaust gas formed by combustion to the catalytic converter;

injecting an additional amount of the fuel following combustion in the second mode of operation;

measuring a temperature of the exhaust gas at least one of in and downstream from the catalytic converter; and comparing the temperature of the exhaust gas with a threshold value;

wherein a maximum temperature is measured and compared with a lower threshold value.

9. A method for diagnosing a catalytic converter of an internal combustion engine of a motor vehicle, comprising the steps of:

injecting a fuel directly into a combustion chamber;

burning the fuel during an intake phase in a first mode of operation and during a compression phase in a second mode of operation;

sending an exhaust gas formed by combustion to the catalytic converter:

injecting an additional amount of the fuel following combustion in the second mode of operation:

measuring a temperature of the exhaust gas at least one of in and downstream from the catalytic converter: and comparing the temperature of the exhaust gas with a threshold value;

wherein a temperature increase is measured and compared with a modeled temperature increase, and a difference between the temperature increase and the modeled temperature increase is compared with an upper limit value.

* * * * *